Figure 1:
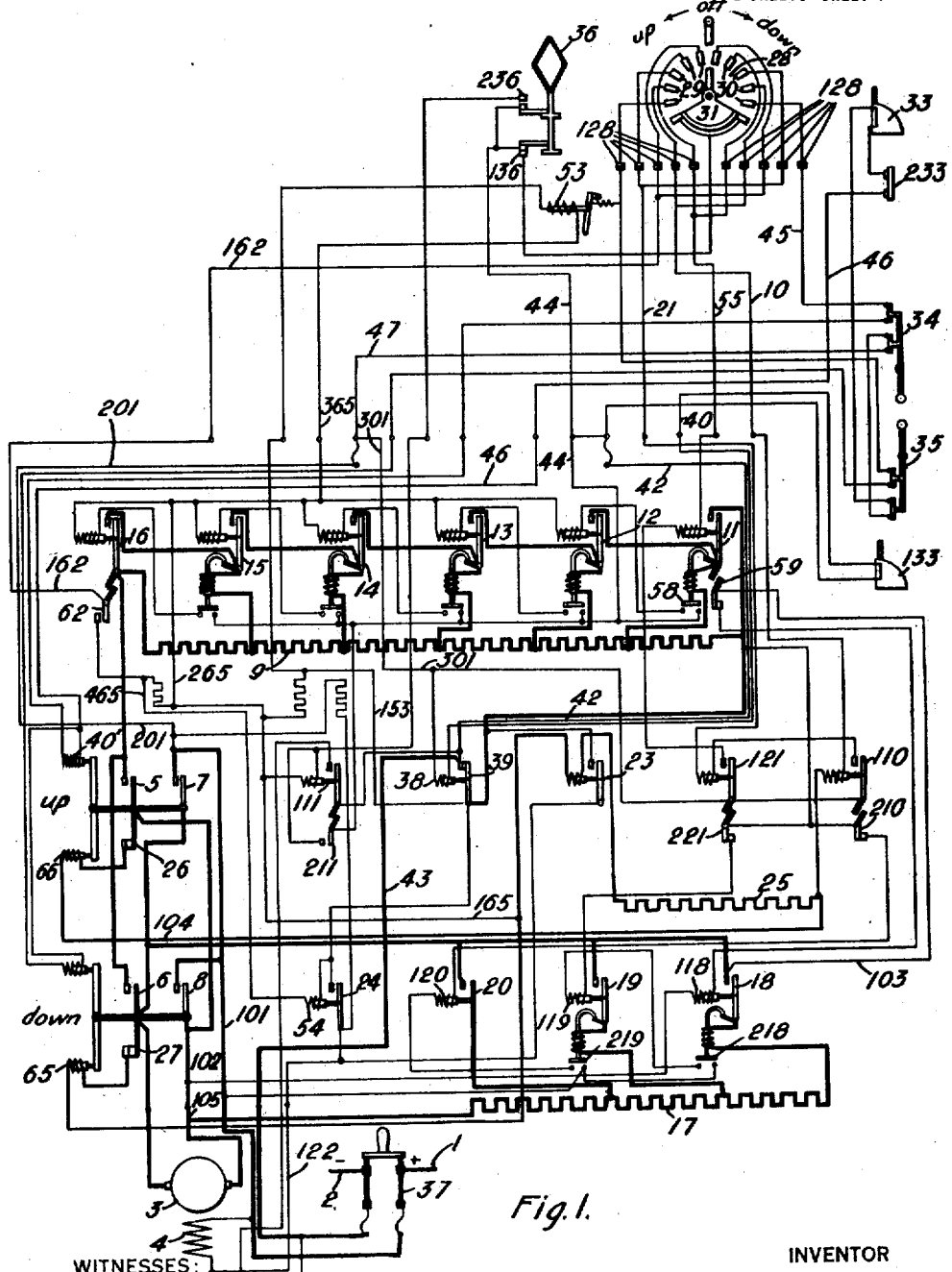

H. L. KEITH.
MOTOR CONTROL SYSTEM.
APPLICATION FILED DEC. 14, 1918.

1,400,077.

Patented Dec. 13, 1921.
2 SHEETS—SHEET 1.

WITNESSES:

INVENTOR
Harold L. Keith
BY
ATTORNEY

H. L. KEITH.
MOTOR CONTROL SYSTEM.
APPLICATION FILED DEC. 14, 1918.
1,400,077.
Patented Dec. 13, 1921.
2 SHEETS—SHEET 2.
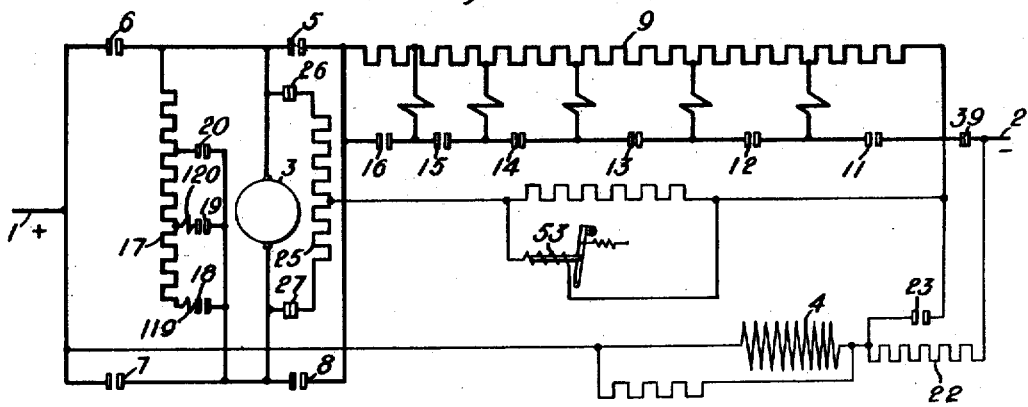
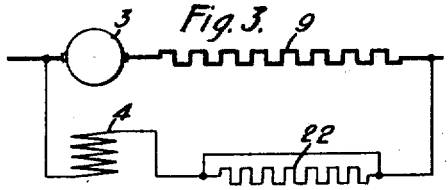
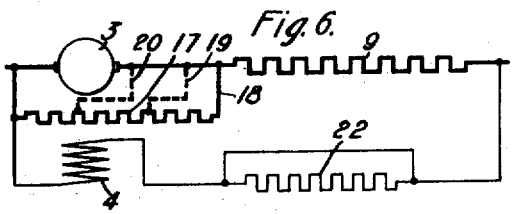
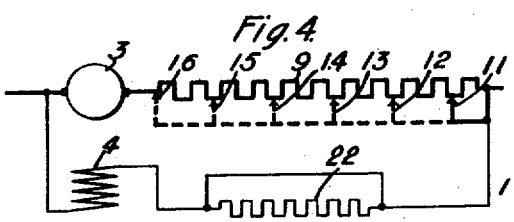
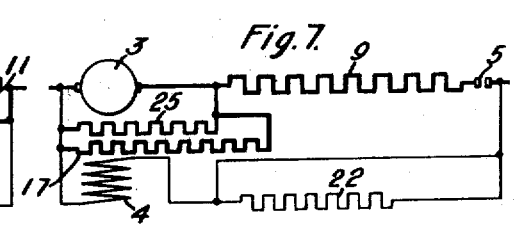
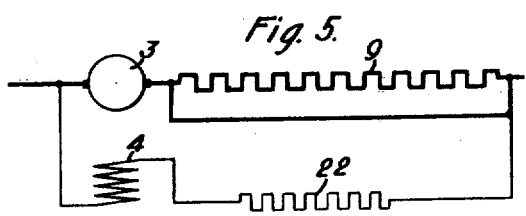
WITNESSES:
H. J. Shelhamer
David Rines
INVENTOR
Harold L. Keith
BY
Wesley G. Carr
ATTORNEY

UNITED STATES PATENT OFFICE.

HAROLD L. KEITH, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,400,077.

Specification of Letters Patent. Patented Dec. 13, 1921.

Application filed December 14, 1918. Serial No. 266,691.

*To all whom it may concern:*

Be it known that I, HAROLD L. KEITH, a citizen of the United States, and a resident of Wilkinsburg, in the county of Allegheny, and State of Pennsylvania, have invented a new and useful Improvement in Motor-Control Systems, of which the following is a specification.

My invention relates to motor-control systems and particularly to such systems as embody means for automatically accelerating electric motors and for bringing the same to rest by means of dynamic braking.

My invention has for its object to provide a simple arrangement whereby an electric motor may be automatically and gradually accelerated upon the closing of its circuit and whereby said motor may be brought to rest quickly, and safely by means of a graduated dynamic-braking force.

My invention is particularly applicable to elevators, hoists, and similar machines. I provide the motor of such a machine with three resistors one of which is in series with the motor armature, and the other two in shunt therewith. The series resistor may be short circuited to effect the automatic acceleration of the motor; one of the shunt resistors may be employed in conjunction with the series resistor, to decelerate the motor and the other shunt resistor, besides aiding the decelerating operation is so connected as to prevent a premature reversal of the motor.

The first-named shunt resistor is controlled, for deceleration purposes, in accordance with the strength of the current traversing the motor circuit and, though normally not employed for acceleration, may be so employed to control the speed of the motor. The series resistor is greater than is requisite for light loads, the excess portion being adapted to be short circuited by a time-element device which controls also the operation of the first-named shunt resistor. A fourth resistor, in series with the field magnet winding, is controlled by a governor which is responsive to the motor speed through a relay.

In the accompanying drawings, Figure 1 is a diagrammatic view of circuits and apparatus embodying my invention. Fig. 2 is a diagrammatic view of a schematic arrangement of the system of Fig. 1. Figs. 3 to 7, inclusive, are diagrammatic views of the various circuits completed through the motor.

Line conductors 1 and 2, which may be connected to any suitable source of direct current, supply power to an electric motor having an armature 3 and a shunt field-magnet winding 4. The motor may be operatively connected, for example, to an elevator car. The direction of rotation of the motor is controlled by reversing contactors 5, 6, 7 and 8; the contactors 5 and 7 and 6 and 8 being respectively mechanically connected in pairs.

A sectional starting resistor 9, which is in series with the armature 3, is controlled by a series of progressively actuated contactors 11, 12, 13, 14, 15 and 16. A resistor 17, which is adapted to be connected in parallel with the armature 3, is controlled by a series of contactors 18, 19 and 20. A resistor 22, which is in circuit with the shunt field-magnet winding 4, is controlled by relays 23 and 24. The resistor 17 is adapted to be connected in a dynamic braking circuit. A secondary dynamic-braking circuit comprises a resistor 25, which is connected in a local circuit with the motor armature 3 by switches 26 and 27 that are respectively connected to the reversing contactors 5 and 6.

The circuits of the actuating coils of the several contactors are governed by a master switch 28 which comprises a series of stationary contact members 29 and 30 and a movable contact segment 31, which successively engages the contact members 29 or 30, according to the direction in which the master switch handle is actuated from its "off" or inoperative position. The system comprises also an emergency switch 33 and a pilot switch 133, which may be located in the elevator car, limit switches 34 and 35, which may be located, respectively, at the top and the bottom of the elevator shaft, and a safety-plank switch 233. A speed-control governor 36 operates to break the control circuit by opening a switch 136 when the speed of the car or the motor exceeds a predetermined rate. Before the switch 136 may open, however, a second switch 236 may be closed to energize the actuating coil of a relay 111 for short-circuiting a portion of the resistor 22, thereby to strengthen the motor field. The relay 111 is provided with a mechanically interlocked switch 211 for creating a holding circuit for the coil of the relay 111.

It may be assumed that the several electromagnetic switches are in their inoperative positions and that a main switch 37 has been closed. Assuming that the pilot switch 133 is also closed, a circuit is completed which extends from the positive line conductor 1, through the switch 37, by conductors 101, 201 and 301, through the actuating coil 38 of a main-line contactor 39, a conductor 40, the pilot switch 133, conductors 42 and 43 and the switch 37, to the negative line conductor 2. The main-line contactor 39 will then close and will remain closed so long as the pilot switch 133 is closed.

The arm of the master switch 28 may, in practice, be actuated quickly to either of the extreme limits of its path of movement, or it may be operated slowly. If the master switch arm be actuated quickly, the motor will automatically be accelerated to its highest speed; if comparatively slowly, the operation will depend upon the position of the controller arm, but the result will be substantially the same. The master switch arm may be actuated very slowly, in which case, as described below, the motor may be brought to any one of several predetermined speeds.

I shall first describe the operation of the motor, assuming that the master switch arm has been actuated to an extreme limit of its path of movement quickly, but I shall describe the operation in the sequence produced by the step-by-step actuation of the master switch to its several operative positions.

Assuming, for example, that the master switch arm is actuated in a counter-clockwise direction to cause the movable contact segment 31 to successively bridge the stationary contact members 30, a circuit is completed in the first position of the controller, which extends from the negative line conductor 2, through the switch 37 by the conductors 43, 42 and 44, and through the switch 136, to the contact segment 31. This segment is thus permanently connected to the line conductor 2 but the circuit may be broken at the switch 136, in accordance with the operation of the governor 36.

From the contact segment 31, the circuit continues through the first two contact members 30, which are bridged by the contact segment 31, the conductor 45, the limit switch 34, the actuating coil 40' of the reversing switches 5 and 7, a conductor 46, the safety-plank switch 233, the emergency switch 33, the limit switches 35 and 34, conductors 47, 201 and 101, and the switch 37, to the positive line conductor 1.

The coil 40' is energized to close the reversing contactors 5 and 7 to establish the armature circuit for the motor which extends from the positive line conductor 1, through the switch 37, the conductor 101, the reversing contactor 7, the armature 3, the reversing contactor 5, the resistor 9, the contactor 39, the conductor 43, and the switch 37, to the line conductor 2. A brake coil 53 and the actuating coil 54 of the relay 24 are thereupon energized by circuits respectively, as follows: from the line conductor 1, through the switch 37, the conductor 101, the contactor 7, the switch 27, the coil 65 for controlling the switch 27, conductors 165, 265 and 365, the brake coil 53, a conductor 153, the contactor 39, the conductor 43, and the switch 37, to the line conductor 2; and from the conductor 165, which, as may be seen, by reference to the circuit just traced, is connected to the conductor 1, through a conductor 465, the coil 54, the contactor 39, the conductor 43 and the switch 37, to the line conductor 2. Simultaneously with the closing of the motor circuit, therefore, the brake is released and the relay 24 is closed to short circuit the resistor 22 and thus to insure a strong magnetic field in starting the motor. The main motor circuits, as they appear at this time, are diagrammatically shown at Fig. 3. The circuit of the field-magnet winding 4 extends from the line conductor 1, through the switch 37, the field-magnet winding 4, the resistor 22 and the switch 37, to the line conductor 2. When the relay 24 is closed, the circuit extends from the line conductor 1, through the switch 37, the field-magnet winding 4, a conductor 122, the relay 24, the line contactor 39, the conductor 43 and the switch 37, to the line conductor 2.

The winding 4 and the brake coil 53 are in practice shunted by resistors, which are diagrammatically illustrated at Fig. 2, but which, along with other refinements, have been omitted from Fig. 1 in order not to complicate the circuits of that figure unnecessarily.

When the master-switch arm is actuated to the second position, a circuit is completed from the contact segment 31, which is connected to the negative line conductor 2, through the third contact member 30, a conductor 10, the actuating coil of a contactor 110, the resistor 25, the actuating coil of the relay 23, the coil 65, the switch 27, the reversing contactor 7, the conductor 101 and the switch 37 to the line conductor 1.

As the actuating coil of the relay 23 is a series coil, it is not sufficiently energized to effect the closing of the relay 23. The actuating coil of the contactor 110, however, closes that contactor to cause the opening of a switch 210 which controls the actuating coil 120 of the contactor 20.

When the master-switch arm is actuated to its third position, a circuit is completed from the contact segment 31, which is connected to the negative line conductor 2, through the fourth contact member 30, by a conductor 21, through the actuating coil of a contactor 121 and the contactor 110, by the conductors 301, 201 and 101, and through the switch 37, to the line conductor 1. Energization of this circuit causes the closing of the contactor 121 and the consequent opening of a switch 221, which controls the actuating coil 119 of the contactor 19. The function of the actuating coils 120 and 119 and the manner of their control by the switches 210 and 221 is described below.

When the master-switch arm is actuated to its fourth position, a circuit is completed which extends from the movable contact segment 31, which is connected to the negative line conductor 2, through the fifth contact segment 30, by a conductor 55 through the actuating coil of the contactor 11 and the switch 121 and by the conductors 301, 201 and 101, to the switch 37 and the positive line conductor 1.

The contactor 11 is then closed to short circuit a section of the resistor 9, as shown by full lines at Fig. 4, and, when the current traversing the motor circuit falls to a predetermined value, a relay 58, which is mechanically connected to a contactor 11, closes to complete a circuit for the actuating coil of the contactor. The closing of the contactor 11, furthermore, operates the relay 59 that is mechanically connected thereto to open the circuit of the actuating coil 118 of the contactor 18, this circuit, when closed, being energized by the counter-electromotive force of the motor as follows: from the point 102, which is connected to one brush of the armature 3, through the coil 118, the relay 59, and the conductor 103, to the point 104, which is connected to the other brush of the armature 3.

The purpose of opening the switch 59 at this time, before the motor speed has become great enough to develop sufficient counter-electromotive force to close the contactor 18 through the energization of the above-traced circuit of the coil 118, is to prevent the closing of the contactor 118 and thus to preclude the insertion into the motor circuit of the resistor 17. The normal acceleration of the motor is thus effected by means of the resistor 9 alone, and the energy which would be dissipated by current which would otherwise traverse the resistor 17, is saved. The opening of the switches 210 and 221 upon the controller arm reaching its second and third positions, respectively, has a similar purpose in view, namely, that of preventing the energization of the coils 120 and 119 during the normal acceleration of the motor which it is desired to effect without employing the resistor 17. This will be better understood from the description given below. The necessity for closing the contactors 110 and 121 before the operation of short-circuiting the resistor 9 has commenced, furthermore, provides a time-element for controlling the short-circuiting operation of the resistor 9 which is found, in practice, to be very beneficial.

The circuit of the actuating coil of the contactor 12 may be traced from the positive line conductor 1, through the switch 37, the conductor 101, the reversing switch 7, the switch 27, the coil 65, the conductors 165 and 265, the actuating coil of the contactor 12, the relay 58, the conductors 44, 42 and 43 and the switch 37, to the negative line conductor 2. Upon the closing of this circuit, the contactor 12 is closed to shunt a second section of the resistor 9. A relay similar to the relay 58, which is mechanically connected to the contactor 12, closes to complete a circuit for the actuating coil of the contactor 13, this coil being in parallel relation to the actuating coil of the contactor 12. Similarly, contactors 14, 15 and 16 close automatically when the current traversing the coil of the current-limit relay, that is connected to the preceding contactor, to close, falls to a predetermined value. The successive steps are diagrammatically illustrated at Fig. 4. The gradual decrease in resistance of the series circuit of the motor causes the gradual acceleration of the motor.

The contactor 11 controls a section of the resistor 9, which, if the motor were operating on light load only, might be dispensed with. The introduction of this additional portion of the resistor 9 serves a useful purpose during the acceleration of the motor, with light load, in that sudden jerks of the elevator or other mechanism controlled by the motor are thereby avoided. On heavy load, of course the motor will not jerk; so that, the portion of the resistor which is controlled by the contactor 11 could be omitted if the motor were adapted for heavy loads only.

When the master-switch arm is actuated to the fifth or final position, a short circuit is established which extends from the line conductor 2, through the switch 37, the conductor 43, the line switch 39, the coil 54, the conductor 465, through the switch 62 which, being mechanically connected to the last accelerating contactor 16, is closed when that switch is closed, and the conductor 162, to the last contact member 30 which, in the final position of the master-switch arm, is bridged by the contact member 31, which is connected to the negative line conductor 2. The short circuiting of the coil 54 permits the opening of the switch 24 to insert the resistor 22 in series with the shunt field-magnet winding 4, as is diagrammatically indicated at Fig. 5, thereby further to acelerate the motor. The motor then operates at its normal speed, with the entire series resistor 9 short-circuited and with a weakened magnetic field.

If, during the acceleration of the motor, or, after it has been brought up to speed, the motor speed exceeds a predetermined value, the switch 236 will close to cause the closing of the circuit of the actuating coil of the relay 111. This circuit extends from the conductor 165 which, as may be seen by reference to the circuits traced above, is connected to the positive line conductor 1, through the actuating coil of the relay 111, the switch 236, conductors 44, 42 and 43, which is connected to the negative line conductor 2. The closing of the relay 111 causes the closing of a switch 211, which is mechanically connected thereto, to create a holding circuit for the actuating coil of the relay 111. This holding circuit extends from the conductor 165, which is connected to the line conductor 1, through the actuating coil of the relay 111, the switch 211, the conductors 44 and 42, which are connected to the line conductor 2. The closing of the relay 111 causes the short-circuiting of a portion of the resistor 22 with the consequent strengthening of the motor field and corresponding reduction of speed, the circuit being from the line conductor 1, through the switch 37, the shunt field-magnet winding 4, a portion of the resistor 22, the relay 111, the conductor 43 and the switch 37, to the line conductor 2. The creation of a holding circuit for the coil of the relay 111 prevents the continued opening and closing of the relay 111 which would otherwise be caused by the continued opening and closing of the switch 236 in accordance with changes in the speed of the motor. Should the motor fail to respond to the operation of the relay 111 when closed and attain a second and higher predetermined speed, the switch 136 will be opened to cause the opening of all the control circuits, and stop the car. The relay 111, once closed, cannot be reopened until the master switch handle is returned to its "off" position or until the switch 136 is opened, the latter of which will be caused by excessive, undesirable speed of the motor.

This arrangement of circuits for the relay 111 permits regulation of the motor within predetermined limits, say 15%, under all load conditions. If the elevator car, for example, starts downward, heavily loaded, it may overspeed, in which event the relay 111 will close to effect automatically a desirable speed reduction. After the car has been stopped, at any desired floor, by suitable manipulation, to the "off" position, of the master switch 28, and, a number of passengers having alighted, restarted downward with sufficiently reduced load, the relay 111 will remain open because there will be no overspeeding. The change in load affects the motor speed, and the relay 111 remains open or becomes closed in accordance with the speed of the governor 36 which is controlled by the speed of the motor. Once closed, because of excessive speed, it remains closed until reopened by the master switch to suit a probably changed load.

The switch 136 is so designed (although this is not illustrated, it being common practice) that, once it has been automatically opened by excessive motor speed, it cannot be again closed except manually.

When the master-switch arm is operated toward the "off" position, the shunt circuit for the coil 54 is opened in the fourth position of the controller and the switch 24 closes to shunt the field resistor 22 and, therefore, strengthen the magnetic field of the motor. The circuits are again as shown at Fig. 4, the risistor 9 still being short-circuited. The motor speed is reduced. The actuation of the master-switch arm to its third position opens the circuit of the actuating coil of the contactor 11, and the latter, in opening, causes the opening of the relay 58, which breaks the circuit of the actuating coil of the contactor 12. Similarly, the opening of the contactor 12 causes the opening of the relay which is mechanically connected thereto to cause the opening of the circuit of the actuating coil of the contactor 13. In similar fashion, the contactors 14, 15 and 16 are also opened, each contactor, as it opens, inserting a corresponding section of the resistor 9 into the motor circuit, as is illustrated at Fig. 3. The opening of the contactor 11 permits the closing of the relay 59 which, thereupon, closes the circuit, above traced, of the coil 118 across the terminals of the motor armature. The contactor 18 is thereupon closed to connect the resistor 17 in a dynamic braking circuit across the terminals of the armature, as is illustrated by full lines at Fig. 6. The circuit extends from the point 105, which is connected to one brush of the motor armature, through the resistor 17, the actuating coil of a relay 218, which is mechanically connected to the contactor 18, and the contactor 18 to the point 104, which is connected to the other brush of the armature 3. Energization of this circuit causes also the energization of the actuating coil of the relay 218, which relay will remain open until the current traversing this circuit falls to a predetermined value.

When the master-switch arm is actuated to its second position, the circuit of the actuating coil of the contactor 121 is broken, whereupon the contactor 121 is opened and the switch 221 closed. When, therefore, the relay 218 is closed, in accordance with current conditions, a circuit will be established for the coil 119 of the contactor 19, extending from the positive line conductor 1 through the switch 37, the contact members of the relay 218, the coil 119, the switch 221, the contactor 39, the conductor 43 and the switch 37, to the negative line conductor 2. The closing of the contactor 19 causes the short circuiting of a portion of the resistor 17, as indicated by the dotted line 19 in Fig. 6.

The dynamic braking circuit may now be traced from the point 105, which is connected to one terminal of the armature, through a portion of the resistor 17, the actuating coil of a relay 219, which is mechanically connected to the contactor 19, and the contactor 19, to the point 104, which is connected to the other terminal of the armature 3. Similarly, if the master-switch arm has been actuated to its first position, to break the circuit of the actuating coil of the contactor 110, the switch 210 will be closed and, when the relay 219 has been closed, in accordance with current conditions, the circuit of the coil 120 will be closed to cause the short-circuiting of a second portion of the resistor 17, indicated by the dotted line 20 at Fig. 6. The coil 120 is in parallel relation to the coil 119. Finally, when the counter-electromotive force of the motor falls to a sufficiently low value, the coil 118 will become deënergized and the contactor 18 will open (this usually taking place after the motor is at rest and the magnet brake applied), causing the opening of the relay 218 which, in turn, will cause the opening of the circuit of the coil 119. The contactor 19 thus opening the relay 219, will open to open the circuit of the coil 120. The resistor 17 is now disconnected from the motor circuit, as is diagrammatically represented at Fig. 3.

It will be obvious that the coil 118, like those numbered 119 and 120, may be connected directly across the line, instead of being energized by the counter-electromotive force of the motor. In either event, the relays 218 and 219 for controlling the coils 119 and 120, respectively, cannot be closed until the current in the dynamic braking circuit, including the resistor 17, falls to a sufficiently low value. I regard this current limit slow-down as a very important feature of my invention. If the coil 118 is connected across the line, however, this coil may be energized before its circuit is broken at 59, in which case, the alternative accelerating operation described below, with the aid of the resistor 17, would obtain.

It will be noted further, that, according to my system of control, the series resistor 9 is first entirely inserted into circuit and then the resistor 17 is operated to control the deceleration of the motor. I consider this system to be an improvement upon the systems of the prior art which control both resistors simultaneously.

The insertion of the series resistor 9 and the gradual shunting of the parallel-connected resistor 17 operate to quickly and smoothly decrease the speed of the motor by reason of the increased resistance of the armature circuit and the establishment of a low-resistance shunt circuit or dynamic-braking circuit for the motor. In practice, the master switch handle will be held in this first position until the motor has been retarded to a speed from which an accurate stop is readily accomplished by further dynamic braking combined with the magnet brake.

When the master-switch arm has been actuated to its "off" or illustrated position, braking the circuit of the coil 40', the reversing contactors 5 and 7 will be opened to open the armature circuit of the motor and the switch 26 closed. The circuit of the brake coil 53 is opened by the contactor 7, allowing the brake to set, the deënergizing of this coil being delayed by the shunt circuit, shown at Fig. 2, comprising a discharge resistance which connects its terminals. An additional dynamic braking circuit is then established from one brush of the motor armature, through the switch 27, the coil 65, the actuating coil of the relay 23, the dynamic brake resistor 25, the coil 66 and the switch 26, to the other terminal of the motor armature 3. The circuits are diagrammatically illustrated at Fig. 7, a temporary parallel path being shown also through the resistor 17, either through all of this resistor or through part, depending on how quickly the master switch is returned to the "off" position. This will be better understood in connection with the fuller description of the operation of the resistor 17, which is given below. An additional dynamic brake circuit is thus established to aid in slowing down the motor, and, since it comprises the coils 65 and 66, the motor cannot be again started, either in the forward or in the reverse direction, until it has come nearly to rest, the coil 66 overpowering the coil 40' to prevent the closing of the reversing contactors 5 and 7, and the coil 65 overpowering the actuating coil of the reversing contactors 6 and 8. The contactors 5 and 7 and 6 and 8 may be mechanically, as well as electrically, interlocked. The motor is then brought quickly and safely to rest.

The relay 23 closes to short-circuit the resistor 22 so as to provide a strong shunt field for the motor during the dynamic braking period. The circuit of the shunt field-magnet winding 4 extends from the positive line conductor 1, through the switch 37, the field-magnet winding 4, the conductor 122, the relay 23, the contactor 39, the conductor 43 and the switch 37 to the negative line conductor 2. When current ceases to traverse the dynamic-braking circuit, the coil of the relay 23 is deënergized and the latter opens to insert the resistor 22 into circuit with the winding 4. The circuits are then ready for the next succeeding operation.

According to my invention, three resistors are employed, one of which, 9, in series with the motor armature, serves to control the motor during acceleration and deceleration, a second, 17, in shunt with the motor armature, controls the deceleration of the motor, and the third, 25, in shunt with the motor armature, controls the deceleration of the motor and prevents premature reversal. The resistor 17, may, however, be also employed during acceleration of the motor to control the motor speed.

In order to avoid the necessity for describing the reverse operation of the motor, the speed-control operation, by means of the resistor 17, will now be described upon the supposition that the contact segment 31 makes contact with the contact members 29. It will be understood, however, that, where I have described the operation upon the supposition that the contact segment 31 bridges the contact members 30, a corresponding operation exists, with correspondingly changed circuits, for the contact members 29, and, where I shall hereafter describe the operation upon the supposition that the contact segment 31 bridges the contact members 29, a corresponding operation, with correspondingly changed circuits, exist when the contact segment 31 bridges the contact members 30. The process of accelerating the motor has been above described on the supposition that the contact segment 31 has been actuated to bridge the various contact members 30 gradually or all at once. It will now be shown that, if the gradual operation is slow enough, it is possible to obtain, instead of a rapid acceleration of the motor, a speed-control thereof.

Assuming, then, that the controller handle has been actuated to its first position on the left, so that the contact segment 31 bridges the first two contact members 29, a circuit will be established which will extend from the contact segment 31, which is connected to the negative line conductor 2, through the first two contact members 29, which are bridged by the contact segment 31, the limit switch 35, the actuating coil of the reversing contactors 6 and 8, the conductor 46, the safety plank switch 233, the emergency switch 33, the limit switches 35 and 34, the conductors 47, 201 and 101 and the switch 37, to the line conductor 1. The reversing contactors 6 and 8 are thereupon closed to establish the motor circuit for operation in the direction reverse to that established when the reversing contactors 5 and 7 are closed. The motor circuit extends from the positive line conductor 1, through the switch 37, the conductor 101, the reversing contactor 8, the armature 3, current now flowing in the opposite direction, the reversing contactor 6, the resistor 9, the contactor 39, the conductor 43, and the switch 37, to the negative line conductor 2.

The brake coil 53 and the coil 54 are energized in the same way as described above in connection with the motor circuit established upon the closing of the reversing switches 5 and 7, the circuits being as follows: from the line conductor 1, through the switch 37, the conductor 101, the reversing contactor 8, the switch 26, the coil 66, the resistor 25, the actuating coil of the relay 23, the conductors 165, 265 and 365, the brake coil 53, the conductor 153, the contactor 39, the conductor 43 and the switch 37, to the negative line conductor 2. For reasons given above, the coil of the relay 23, though energized, will not be sufficiently energized to close its switch. The circuit of the coil 54 may be traced, as before, from the conductor 165, through the conductor 465, and the coil 54, to the contactor 39, and thence to the line conductor 2.

If the master-switch arm be moved to its second, third, and fourth positions, results similar to those obtained in connection with the previous description will be obtained, in that the coils of the contactors 110, 121 and 11 will be energized, causing the closing of those switches and the opening of the switches 210, 221 and 59. This will be evident from the fact that the third, fourth, fifth and sixth contact members 29 are in parallel relation to the corresponding contact members 30. If, however, the master-switch arm be maintained for a sufficiently long period of time in its first position, the contactors 110, 121 and 11 will remain open and the switches mechanically interlocked with them, viz: those numbered 210, 221 and 59 will remain closed. The motor will build up a counter-electromotive force which will cause the energization of the coil 118 to cause the closing of the contactor 18. This coil will remain energized so long as the switch 59 remains closed if the counter-electromotive force is sufficiently great. The resistor 17 will thus be inserted into parallel circuit with the armature 3.

As there is not a great amount of current traversing the circuit including the armature 3 and the resistor 17, the actuating coil of the relay 218 will not be sufficiently energized to maintain this relay open and, accordingly, this relay will close to cause the energization of the circuit, above described, of the coil 119 to cause the closing of the contactor 19. The coil 119 will remain energized so long as the switch 221 is closed. The relay 219, closing immediately for the same reason which caused immediate closing of the relay 218, will cause the energization of the coil 120, the circuit of which contains the switch 210, to cause the immediate closing of the contactor 20. If, therefore, the master-switch arm be maintained in its first position, the resistor 17 will be connected in shunt to the armature 3 with two portions, viz: those controlled by the contactors 19 and 20, short-circuited, as indicated by dotted lines at Fig. 6. This results in giving to the motor a predetermined speed, which will be substantially uniform under varying loads because of the low-resistance shunt circuit through a section of the resistor 17.

If the master-switch arm now be actuated to its second position, so as to bridge the first three contact members 29 (or, if the master-switch arm be actuated to the right, the first three contact members 30), and the master-switch arm be maintained in that position, the actuating coil of the contactor 110 will be energized to cause the closing of this switch and the opening of the switch 210, which latter opens the circuit of the coil 120, whereupon the contactor 20 opens to insert a second portion of the resistor 17 in parallel circuit with the armature 3. So long, therefore, as the master-switch arm is maintained in this second position, the motor will run at a second predetermined speed.

Actuation of the master-switch arm to its third position will cause the contact segment 31 to bridge the contact member 29 which controls the actuating coil of the contactor 121. Upon the closing of this contactor, the switch 221 is opened and the actuating coil 119 of the contactor 19 is deënergized causing the opening of the contactor 19 and the consequent insertion into the armature circuit of the third portion of the resistor 17, as indicated by full lines at Fig. 6. If the master-switch arm be not actuated further, the resistor 17 will remain in parallel circuit with the armature 3 resulting in giving to the motor a third slow predetermined speed.

When the master-switch arm is actuated to its fourth position, causing the energization of the actuating coil of the contactor 11 and the consequent closing of this contactor, the relay 59 will be opened to break the circuit of the coil 118, thereby to cause the opening of the contactor 18 and the disconnecting of the resistor 17 from the motor circuit, as shown by full lines at Fig. 4. The closing of the contactor 11 permits the closing of the relay 58. This, in turn, causes the energizing of the actuating coil of the contactor 12, and, as before described, the contactors 12 to 16 close in succession to short circuit the resistor 9 and, after the resistor 22 has been inserted, following acuation of the controller to its last position, to bring the motor up to full speed.

The decelerating operation is the same as before described in connection with the operation which obtains when the contact segment 31 is caused to bridge the contact members 30 and then return to "off" position.

My counter-electromotive-force coil 118 plays a special function in connection with the usual limit switches 128 which are employed for stopping the motor at the bottom and top of the elevator shaft.

If the elevator car is approaching one of these limits of movement, with the motor operating under light load, the limit switches 128 will be successively opened to break the circuits of the actuating coils of the contactors 11, 121 and 110 and the reversing contactors, so that the motor will be automatically slowed down and the car stopped at the desired limit of travel. The armature will be connected in a dynamic-brake circuit with the resistor 17, but this will not prevent the car reaching its limit of travel when the motor is operating with light load. Under heavy load, however, this dynamic-brake circuit may tend to stop the car before it reaches the desired point of travel, in which case the last limit switch 128 will not be opened to open the circuit of the reversing-contactor coil. When, however, the counter-electromotive force has become sufficiently reduced to permit the opening of the contactor 18, the master-switch arm being maintained in an operative position, the motor will again accelerate slightly and the car be moved the remaining distance until the last limit switch 128 has been opened to open the actuating coil of the reversing contactors. The car cannot now be restarted except in the reverse direction.

I thus provide for stopping the car at substantially the same limiting points of travel under any conditions of load, and whether the car is traveling "up" or "down".

In accordance with the requirements of the patent statutes, I have described my invention in connection with a motor-control system which I have chosen for purposes of illustration. It will be understood, however, that my invention is not restricted to the specific circuits and apparatus which are illustrated and described and that my invention is to be construed broadly except in so far as limitations may be specifically imposed in the appended claims.

I claim as my invention:

1. The combination with an electric motor having an armature and a resistor, of means for connecting said resistor in parallel relation to said armature and means controlled automatically in accordance with the value of the current traversing said motor for diminishing the effective portion of said resistor to effect the deceleration of said motor.

2. The combination with an electric motor having an armature and a resistor, of means controlled by the counter-electromotive force of said motor for inserting a portion of said resistor into parallel circuit with said armature, and means controlled by the current traversing said motor for inserting the remainder of said resistor into parallel circuit with said armature.

3. The combination with an electric motor having an armature and resistors in series therewith and in parallel thereto, of a switch for controlling said series resistor, a switch for controlling said parallel resistor and having an actuating coil adapted to be energized by the counter-electromotive force of said motor, and a switch mechanically connected to said first-named switch for maintaining the circuit of said coil open when said first-named switch is closed and for closing the circuit of said coil when said first-named switch is open.

4. The combination with an electric motor having an armature, a resistor and a master switch, of means for connecting said resistor in parallel relation to said armature, and means for varying the effective portion of said resistor in accordance with the position of said master switch and the value of the current traversing said motor.

5. The combination with an electric motor, of means operable at a predetermined speed of said motor to establish a second and lower predetermined motor speed and operable, when the motor speed is above a predetermined maximum rate, to open the circuit of said motor.

6. The combination with an electric motor having a field-magnet winding, of a speed-responsive device for increasing the energization of said winding when the motor operates above a predetermined speed and for opening the motor circuit when the motor exceeds a second and higher predetermined speed.

7. The combination with an electric motor having an armature, a resistor in parallel thereto, and a resistor in series therewith, said series resistor being greater than is necessary to start said motor on heavy load, of a time-element device for controlling said parallel resistor and the excess portion of said series resistor.

8. The combination with an electric motor having an armature, a resistor and a master switch, of means controlled in accordance with the value of the counter electromotive force of said motor for connecting said resistor in parallel relation to said armature, and means comprising said master switch for rendering said connecting means ineffective under predetermined operating conditions.

9. The combination with an electric motor having an armature, a switch operable in accordance with the value of the counter-electromotive force of said motor and a resistor adapted to be connected in parallel relation thereto upon the closing of said switch, of means for effecting a speedy acceleration of said motor without the aid of said resistor and for effecting a slower acceleration of said motor with the aid of said resistor.

10. The combination with an electric motor having an armature, a resistor in series therewith and a resistor adapted to be connected in parallel thereto when the motor is moving at a predetermined speed, of means for preventing said connection during the normal acceleration of said motor, and means for effecting said connection to control the speed of said motor.

11. The combination with an electric motor having a resistor, of means controlled by the speed of said motor for controlling the electrical connections of said resistor, and means comprising a master switch for rendering said controlling means ineffective when said switch is actuated above a predetermined rate.

12. The combination with an electric motor having a shunt field-magnet winding and a resistor in circuit therewith, of a switch for controlling said resistor, means controlled by the speed of said motor for controlling said switch, and a switch mechanically connected to said controlling switch for rendering said controlling switch independent of said speed-controlled means.

13. The combination with an electric motor, and a speed-responsive device, of means controlled by said device and operable under emergency conditions to decrease the speed of said motor to a predetermined rate, said means being operable to maintain said motor at the lower rate until the motor circuit is opened.

14. The combination with an electric motor and controller therefor operable through a predetermined cycle, of a plurality of control circuits for said motor, and means for rendering one or another of said control circuits effective in accordance with the rate of the operation of said controller through said cycle.

15. The combination with an electric motor, of speed-controlled means, operable when the motor rotates above a predetermined speed, for establishing a second and lower predetermined motor speed, and means for maintaining the operation of said motor at said second predetermined speed.

16. The combination with an electric motor, of speed-controlled means, operable when the speed of said motor is abnormally high, for establishing a predetermined motor speed, and means for maintaining the operation of said motor at said predetermined speed until the opening of the circuit of said motor.

17. The combination with an electric motor and means for decelerating said motor, of means for automatically increasing the speed of said motor when said speed falls below a predetermined value.

18. The combination with an electric motor, of means comprising a resistor, a limit switch and a switch controlled by the counter-electromotive force of said motor and by said limit switch for automatically stopping said motor at a predetermined point in its operation.

19. The combination with an electric motor having an armature and a resistor in parallel relation thereto, of means controlled in accordance with the value of the counter-electromotive force of said motor for controlling the connection of said resistor to said armature.

20. The combination with an electric motor and means for effecting dynamic braking thereof, of a controlling switch, and means for rendering said dynamic braking means ineffective when the speed of said motor falls to a predetermined rate and said controlling switch is in an operative position.

In testimony whereof, I have hereunto subscribed my name this 29th day of Nov., 1918.

HAROLD L. KEITH.